US012124446B2

(12) United States Patent
Yu et al.

(10) Patent No.: US 12,124,446 B2
(45) Date of Patent: Oct. 22, 2024

(54) INTELLIGENT SHARING PAGINATION MECHANISM ADAPTIVE TO HUGE DATA

(71) Applicant: SAP SE, Walldorf (DE)

(72) Inventors: Xia Yu, Shanghai (CN); Baolin He, Shanghai (CN); Jie Yao, Shanghai (CN)

(73) Assignee: SAP SE, Walldorf (DE)

( * ) Notice: Subject to any disclaimer, the term of this patent is extended or adjusted under 35 U.S.C. 154(b) by 880 days.

(21) Appl. No.: 16/705,753

(22) Filed: Dec. 6, 2019

(65) Prior Publication Data
US 2021/0173838 A1 Jun. 10, 2021

(51) Int. Cl.
| G06F 16/00 | (2019.01) |
| G06F 16/22 | (2019.01) |
| G06F 16/23 | (2019.01) |
| G06F 16/2453 | (2019.01) |

(52) U.S. Cl.
CPC .... *G06F 16/24539* (2019.01); *G06F 16/2282* (2019.01); *G06F 16/2379* (2019.01)

(58) Field of Classification Search
CPC ............... G06F 16/128; G06F 16/2282; G06F 16/2379; G06F 16/24539
USPC ........................................................ 707/715
See application file for complete search history.

(56) References Cited

U.S. PATENT DOCUMENTS

| 10,505,825 | B1 * | 12/2019 | Bettaiah | G06F 3/04847 |
| 10,924,275 | B1 * | 2/2021 | Kumar | H04L 9/14 |
| 2005/0256834 | A1 * | 11/2005 | Millington | G06F 16/972 |
| 2012/0110515 | A1 * | 5/2012 | Abramoff | G06F 16/904 |
| | | | | 715/854 |
| 2012/0290609 | A1 * | 11/2012 | Britt | G06Q 20/047 |
| | | | | 707/769 |
| 2013/0332487 | A1 * | 12/2013 | Ramesh | G06F 16/24539 |
| | | | | 707/775 |
| 2019/0236184 | A1 * | 8/2019 | Dvinov | G06F 16/2453 |
| 2020/0117365 | A1 * | 4/2020 | Patwardhan | G06F 11/1461 |
| 2021/0081179 | A1 * | 3/2021 | Kenkre | G06F 8/77 |

OTHER PUBLICATIONS

Merriam-Webster's Collegiate Dictionary 340 (11th ed. 2012).*

* cited by examiner

*Primary Examiner* — Vincent F Boccio
(74) *Attorney, Agent, or Firm* — Sterne, Kessler, Goldstein & Fox P.L.L.C.

(57) ABSTRACT

Disclosed herein are system, method, and computer program product embodiments for processing a data query from a user device. In an embodiment, a data storage operator receives the data query from the user device. The data storage operator determines that the data query is a snapshot query and the snapshot query does not have a skiptoken. The data storage operator then determines that the snapshot query satisfies snapshot conditions and takes a snapshot based on the snapshot query. The data storage operator stores the snapshot into the snapshot storage and extracts data from a data storage based on the snapshot. The disclosed system enables an intelligent data query by determining whether or not to perform snapshot query. When performing snapshot query, the snapshot is stored in the snapshot storage for future use. In such a case, the data query is efficient and accurate.

20 Claims, 6 Drawing Sheets

INTELLIGENT SHARING PAGINATION MECHANISM ADAPTIVE TO HUGE DATA

BACKGROUND

Applications of computer networks rely on data storage system to properly carry out designed function since the applications exchange data with other applications or system via data storage system. Records are queried out from one system and sync up to another system. To extract and present data to user, applications use pagination techniques.

The frequency and amount of data exchange with data storage system vary between applications. Cloud based applications have high demand on data exchange. It requires reading and writing large amount of data from and to the data storage system with great efficiency and accuracy. Available pagination techniques are not able to achieve both efficiency and accuracy at the same time. For example, offset pagination may suffer from missing data, obtaining duplicate data, and growing too slow when extracting large amount of data. Hence, a new pagination method is needed.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
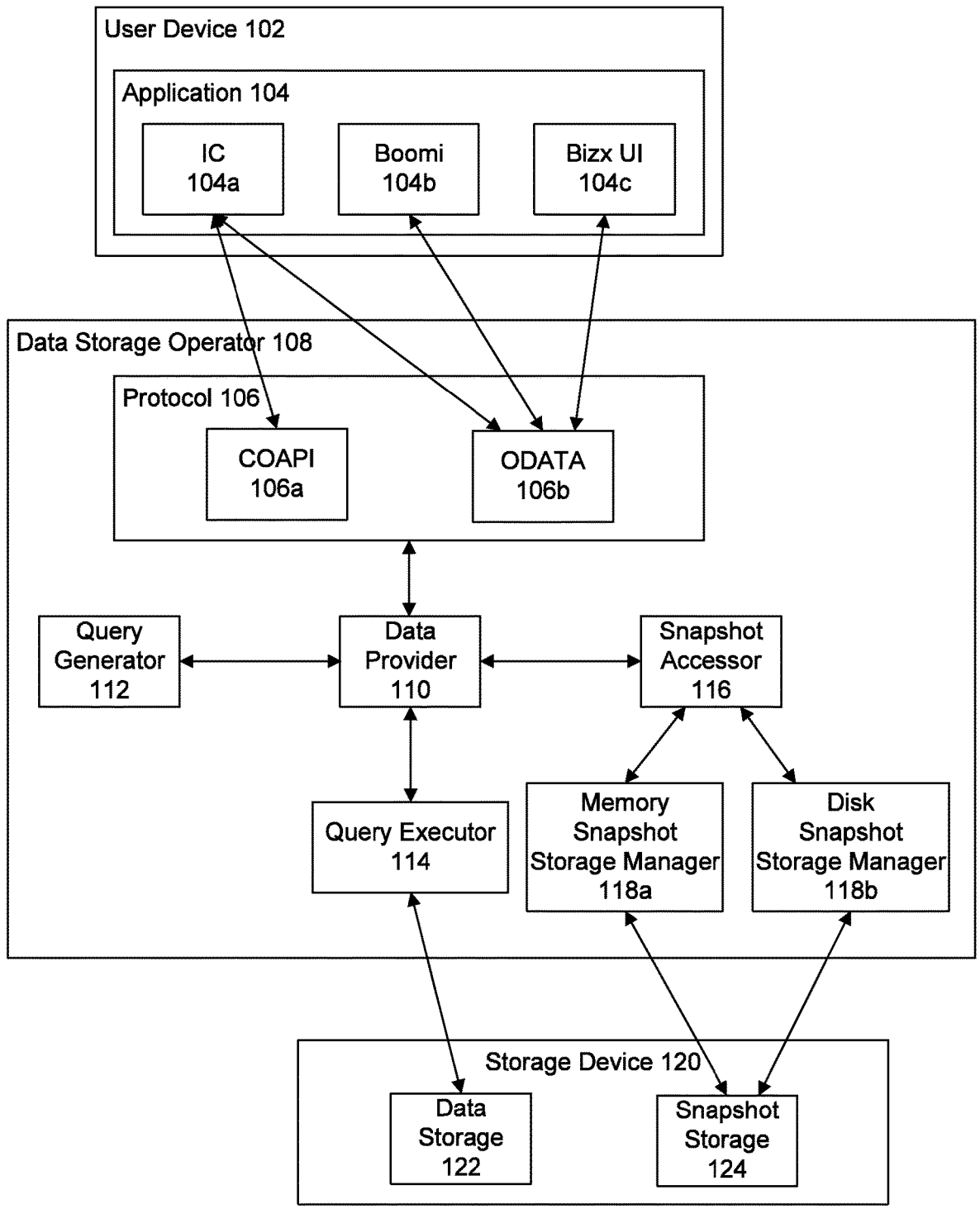
FIG. 1 is a block diagram illustrating an example data storage system that includes a data storage operator, according to some embodiments.

Provided herein are system, apparatus, device, method and/or computer program product embodiments, and/or combinations and sub-combinations thereof, for performing pagination to extract data from data storage system. The embodiments disclosed herein may intelligently choose the best pagination method given the situation hence improve the efficiency and accuracy of the data query process.

As will be appreciated by persons skilled in the relevant art(s), a pagination technique may require two steps: extracting data and presenting the data. Extracting data may comprise obtaining data requested by an user device or an application running in the user device from a data storage media. After extracting the data, the application of the device may present the data in the application. The number of data that can be presented in one page of the screen of the user devices depends on the size and resolution of the screen, or configurations of the application used to present the data in the user device. In an embodiment, the application may request for one page of the data each time and present these data. The application may need multiple requests to extract and present large data set.

In an embodiment, the user device or the application of the user device may initiate the request or a query for data or a data set. A data storage operator may analyze the query and decide to perform an offset pagination or a snapshot pagination. The offset pagination uses offset query or direction query that may be provided with an offset parameter to indicate a starting position of the request data. The offset pagination is effective for a simple query requesting small amount of data, but becomes ineffective and unreliable when dealing with a complex query requesting large amount of data. The snapshot pagination performs snapshot query. The snapshot query does not extract data directly, but takes a snapshot of business keys of the data requested by the query instead. The business keys contain physical locations of the requested data, hence the data storage operator may extract the requested data efficiently and accurately with the business keys. The snapshot may be stored in a snapshot storage hence may be reused in a later time. In an embodiment, the data storage operator manages a snapshot storage table containing the snapshot information such as size of snapshot, timestamp, as well as information of the query. The snapshot storage table may contains a text form of the snapshot query or an identification sequence of the snapshot query. When the user device or the application of user device initiates a new snapshot query matches the information or the identification sequence of the snapshot query stored in the snapshot storage table, the data storage operator extracts the snapshot from snapshot storage directly without taking a new snapshot. In this way, the snapshot pagination saves time and computation resources.

The data storage operator analyzes the query to determine whether or not it is a snapshot query based on the information contained in the query. The snapshot query may contain a snapshot parameter indicating snapshot pagination. In addition, the query may request for a large amount that works better with the snapshot pagination. After the data storage operator identifies the query as the snapshot query, the data storage operator further analyzes the query to identify a skiptoken in the query. The presence of the skiptoken indicates that the query was previously performed hence there is no need to obtain snapshot again. In an embodiment, since the data storage operator extracts one page of the data to be presented in the user device each time, the query may return to the data storage operator with the skiptoken to extract the remaining data. In case that the skiptoken is not present in the query, the operator may further check the possibility of the snapshot pagination. The possibility of snapshot pagination may be based on both the snapshot storage status and properties of the query. If the data storage operator determines that the snapshot pagination is not possible, it process the query with offset pagination. Otherwise, the data storage operator checks the if the query is stored in the snapshot storage. If the query is available in the snapshot storage, the data storage operator uses the stored snapshot to process the query and extract requested data.

In some embodiments, the data storage operator may manage and maintain a list of stored snapshot using the snapshot storage table. The snapshot storage table may comprise multiple rows, each row corresponds to one snapshot, and may comprise the identification sequence, the timestamp, an index and other feature of the snapshot query corresponding to the snapshot. Since the snapshot storage has limited space, the snapshot storage table has limited number of rows. The rows in the snapshot storage table are ordered by indexes of the snapshot query. When the data storage operator takes a new snapshot corresponding to a snapshot query, the data storage operator compares the index of the new snapshot and the largest index in the snapshot storage table. If the index of the new snapshot is smaller than the largest index in the snapshot storage table, the data storage operator removes the snapshot query with the largest index stored in snapshot storage table and inserts the new snapshot into the snapshot storage table.

In an embodiment, the data storage operator divides the snapshot into smaller snapshot chunks and store them in the snapshot storage. When the snapshot query requests for only portion of the snapshot, the data storage operate may exact relevant snapshot chunks. Hence the data storage operator may save computational resources and avoid unnecessary data extraction.

In an embodiment, the data storage operator may store snapshot in different storage locations, for example, memory snapshot storage and disk snapshot storage. The memory snapshot storage may be fast in reading or writing data hence satisfies certain query and system requirements. The disk snapshot storage may have large capacity and be able to store large amount of snapshots.

Embodments described herein optimizes the query process by performing either offset pagination or snapshot pagination based on given conditions. Such design improves the query efficiency as well as accuracy.

These and other features of example embodiments will now be discussed in greater detail with respect to the corresponding figures.

FIG. 1 is a block diagram illustrating an example data storage system 100 that includes an user device 102, according to some embodiments. The user device 102 may include any computing systems, computing devices, laptop, desktop, mobile phone, tablet, software modules, database systems, virtual machines, wearables, appliances, Internet of Things (IoT) device, group of multiple machines, etc., to name just some examples.

In an embodiment, the user device 102 may include application 104. The application 104 may include interaction center (IC) 104a, Boomi applications 104b, Bizx user interface (UI) 104c and any application interacts with storage device 120. The application 104 generates queries to extract data from storage device 120.

The data storage system 100 also comprises a data storage operator 108. The data storage operator 108 may include any computing systems, computing devices, laptop, desktop, server device, IoT device, group of multiple machines, etc. . . . . In an embodiment, the data storage operator 108 may collocate with the storage device 120. In an embodiment, the data storage operator 108 may locate remotely from the storage device 120.

The data storage operator 108 may include protocol 106 to facilitate communication between the user device 102 and the data storage operator 108. In an embodiment, application 104 communicates with the data storage operator 108 via the protocol 106. In some embodiments, protocol 106 may include Coalition of Open Access Policy Institutions (COAPI) 106a and Open Data (ODATA) protocol 106b. IC 104a may communicate with the data storage operator 108 via COAPI 106a and ODATA 106b. Boomi 104b and Bizx UI 104c may communicate with the data storage operator 108 via ODATA 106b.

In some embodiments, the physical connection between user device 102 and data storage operator 108 may be established via wired connection, wireless connection, a wide area network (WAN), a local area network (LAN), mobile network, or any combination thereof.

The data storage operator 108 may also include the data provider 110, the query generator 112, and the query executor 114. In some embodiments, application 104 may generate a request and send the request to the data provider 110 via protocol 106. The data provider 110 converts the request into a query which may include text query or other form of query that can be understood by components of the data storage operator 108.

In an embodiment, the data provider 110 sends the query to the query generator 112. The query generator 112 generates an executable query and sends it back to the data provider 110. The data provider 110 then sends the executable query to query executor 114 to execute and extract the data from the data storage 122 in the storage device 120.

In an embodiment, the data provider 110 determines that the query is a snapshot query and sends the snapshot query to the snapshot accessor 116. The snapshot accessor 116 may locate the snapshot corresponding to the snapshot query through either the memory snapshot storage manager 118a or the disk snapshot storage manager 118b, and extract the snapshot from the snapshot storage 124 in storage device 120. Snapshot accessor 116 them sends the snapshot to the data provider 110. And the data provider 110 sends the snapshot to the query generator 112 to generate executable query for query executor 114 to execute and extract data as described above. In some embodiment, the snapshot storage 124 may be located in a different physical or logical device from the data storage 122.

Figure 2:
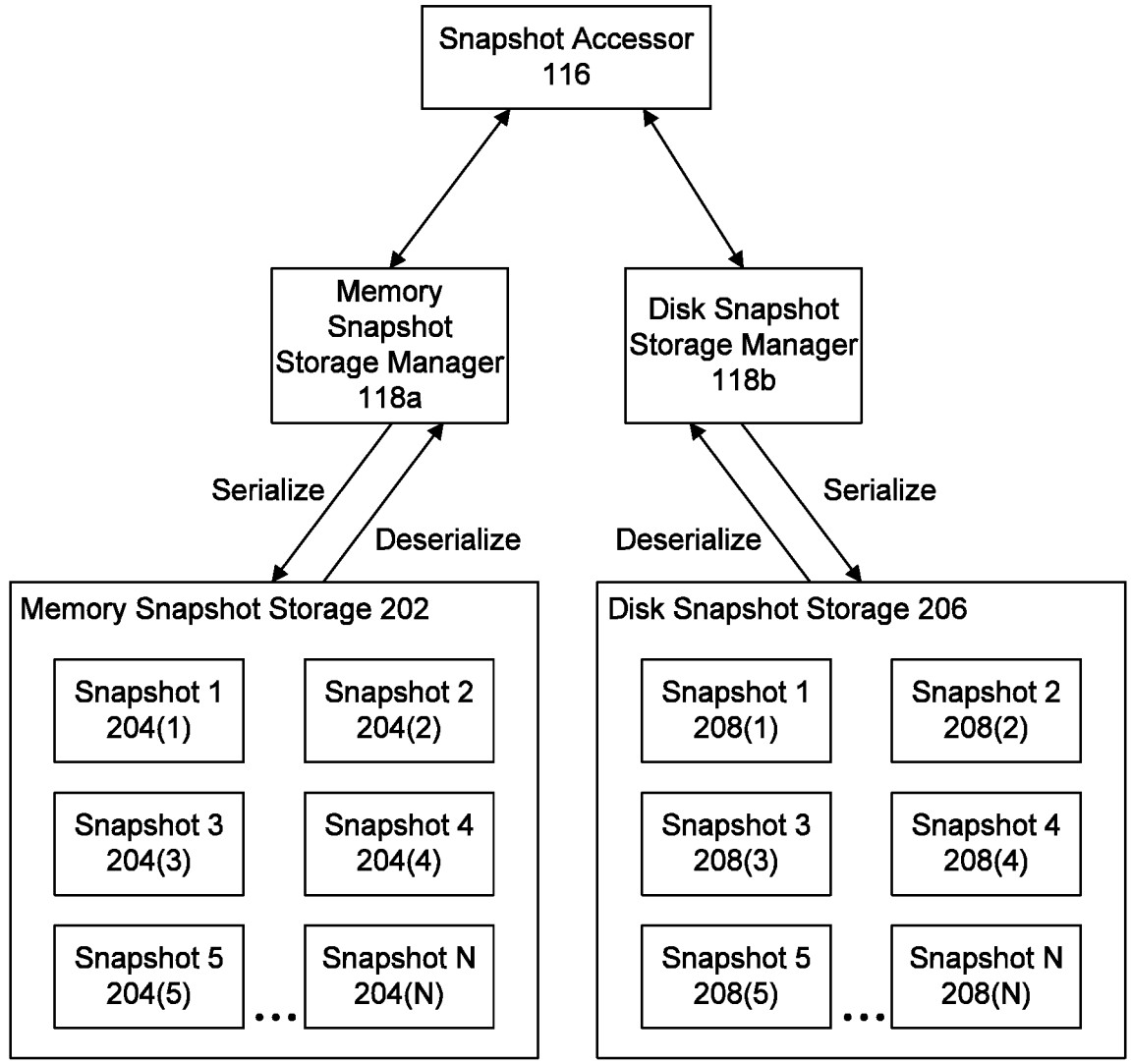
FIG. 2 is a block diagram illustrating an example snapshot storage system, according to some embodiments.

FIG. 2 is a block diagram illustrating snapshot storage system. As described above, snapshot accessor 116 determines the location of the snapshot corresponding to the snapshot query and extract the snapshot via either the memory snapshot storage manager 118a or disk snapshot storage manager 118b. The snapshot accessor 116 may send a snapshot request to the memory snapshot manager 118a, and the memory snapshot storage manager 118a serializes the snapshot request and sends it to the memory snapshot storage 202. The memory snapshot storage 202 locates the snapshot, deserializes it and sends it back to the memory snapshot storage manager 118a. And finally, the memory snapshot storage manager 118a sends the snapshot to the snapshot accessor 116.

In an embodiment, memory snapshot storage 202 may divides large snapshot into smaller snapshot chunks 204. Each snapshot chunk may contain a predetermined number of rows. The snapshot accessor 116 needs not to extract the whole snapshot, but only the snapshot chunks requested. Such design may save computational resources and time by avoiding deserializing and extracting the whole snapshot, especially when the snapshot is large and not every part of the snapshot is requested. The predetermined number of rows may be related to a number of rows that can be presented in one page of the application 104. In other embodiments, the predetermined number of rows may be related to the data structure or the storage capacity of the memory snapshot storage manager 118a and the disk snapshot storage manager 118b. The predetermined number of rows may also be dynamically configured in real time.

Figure 3:
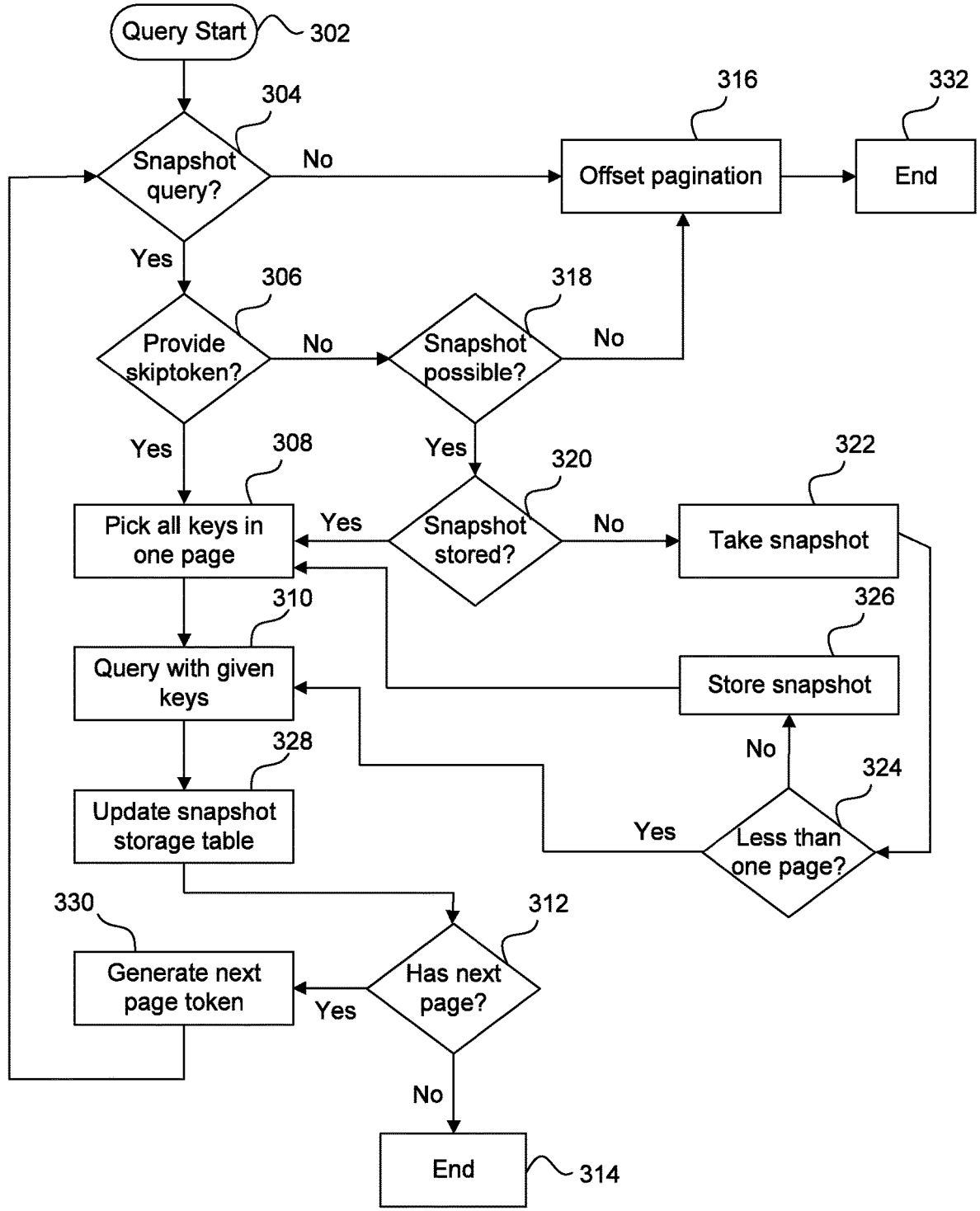
FIG. 3 is a flowchart illustrating a process for an intelligent sharing pagination, according to some embodiments.

FIG. 3 is a flowchart for a method 300 for an intelligent sharing pagination, according to an embodiment. Method 300 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1 and FIG. 2. However, method 300 is not limited to that example embodiment.

In 302, the data provider 110 receives a request from the user device 102. The request may be a descriptive message, a text, or a query. The data provider 110 may convert the request into the query and analyze the query.

In 304, the data provider 110 determines whether the query is a snapshot query. The data provider 110 may determine based on the presence of a snapshot parameter, a value of the snapshot parameter, or a number of rows the query requests. If the data provider 110 determines the query is the snapshot query, the control then moves to 306.

In 306, the data provider 110 determines if the snapshot query has a skiptoken. The presence of the skiptoken indicates that there is at least one earlier snapshot query extracting same data. As described above, the application 104 may present one page of the data at a time, if the data is more than one page, the snapshot query returns to the data provider 110 with the skiptoken after execution. More details of the skiptoken in the snapshot query will be described below. If the data provider 110 determines that there is no skiptoken in the snapshot query, then control moves to 318.

In 318, the data provider 110 verifies if snapshot query is possible, in other words, if the snapshot satisfies snapshot conditions. More details of the verification will be described below in FIG. 4. If the data provider 110 determines that the snapshot query is possible, the control moves to 320.

In 320, the data provider 110 determines if the snapshot of the snapshot query requested is stored in the snapshot storage 124. In an embodiment, the data provider 110 may have access to a snapshot storage table that maintains a record of stored snapshots. The data provider 110 may check the snapshot storage table to see if any of the stored snapshots listed in the table matches the snapshot query. If the data provider 110 determines the snapshot is not stored in the snapshot storage 124, the control moves to 322.

In 322, the data provider 110 takes the snapshot by obtaining business keys of the requested data, wherein the business keys contains locations of the request data.

In 324, the data provider 110 evaluates the snapshot and determines whether the snapshot contains data that may be presented in one page of the application 104. If the data cannot not be present in one page of the application 104, the control moves to 326.

In 326, the data provider 110 sends the snapshot to the snapshot accessor 116, and the snapshot accessor 116 stores the snapshot in the snapshot storage 124. In some embodiments, the snapshot storage 124 may include the memory snapshot storage 202 and the disk snapshot storage 206. The snapshot accessor 116 may choose to store the snapshot in the memory snapshot storage 202, the disk snapshot storage 206 or other storage medias. The snapshot accessor 116 may choose based on the capacity of the storage medias, the available space of the storage medias, the size of the snapshot, or the content of the snapshot.

In 308, the data provider 110 picks the business keys of the data that can be presented in one page of the application 104 from the snapshot.

In 310, the data provider 110 sends the business keys obtained in 308 to the query generator 112 which generates an executable query based on the business keys and sends it back to the data provider 110. The data provider 110 sends the executable query to the query executor 114. The query executor 114 executes the executable query, extracts the requested data and returns the requested data to the application 104 in user device 102 to be presented.

In 328, the data provider 110 updates the snapshot storage table. In an embodiment, the data provider 110 maintains and manages the snapshot storage table. More details of updating the snapshot storage table are described below in FIG. 5.

In 312, the data provider 110 determines if there are more data to be extracted from the data storage 122 based on the snapshot. If there is no more data to be extracted, the control moves to 314 and the intelligent sharing pagination ends.

Referring back to 304, if the data provider 110 determines that the query is not a snapshot query, the control moves to 316.

In 316, the data provider 110 may determine that the query is an offset query hence performs an offset pagination. The data provider 110 sends the offset query to the query generator 112 to generate the executable query, then the query generator 112 sends the executable query to the query executor 114 for execution via the data provider 110. The query executor 114 then sends the extracted data back to the application 104. Then the intelligent sharing pagination ends in 332.

Referring back to 318, if the data provider 110 determines that the snapshot query is not possible, the control moves to 316 to perform the offset pagination as described above.

Referring back to 320, if the data provider 110 determines that the snapshot corresponding to the snapshot query is stored in the snapshot storage, the data provider 110 obtains the snapshot via snapshot accessor 116 as described in FIG. 2, and the control moves to 308. In an embodiment, the data provider checks the snapshot storage table to see if any of the snapshot matches the snapshot query.

Referring back to 324, if the data provider 110 determines that the data contained in the snapshot can be presented in one page of the application 104, the control moves to 310.

Referring back to 306, if the data provider 110 determines that the snapshot query contains the skiptoken, the control moves to 308. In an embodiment, the presence of skiptoken may indicate that the snapshot corresponding to the snapshot query has been obtained previously. The snapshot may be included in the snapshot query, stored in local memory or cache of the data provider 110, or in other easy access memory media. The snapshot may contains business keys that was previously used to extract and present data. The skiptoken may indicate the starting point of unused business keys in the snapshot, hence "skip" the used business keys.

Referring back to 312, if the data provider 110 determines that there are more data to be extracted and presented. The control moves to 330.

In 330, the data provider 110 generates the skiptoken pointing to the next page in the snapshot, attaches the skiptoken to the snapshot query and return the snapshot query to the data provider 110. The control then moves back to 304. In some embodiments, the control moves from 330 to 304 multiple times for one snapshot query. In such case, the snapshot contains the data that may fill multiple pages in the application 104.

Figure 4:
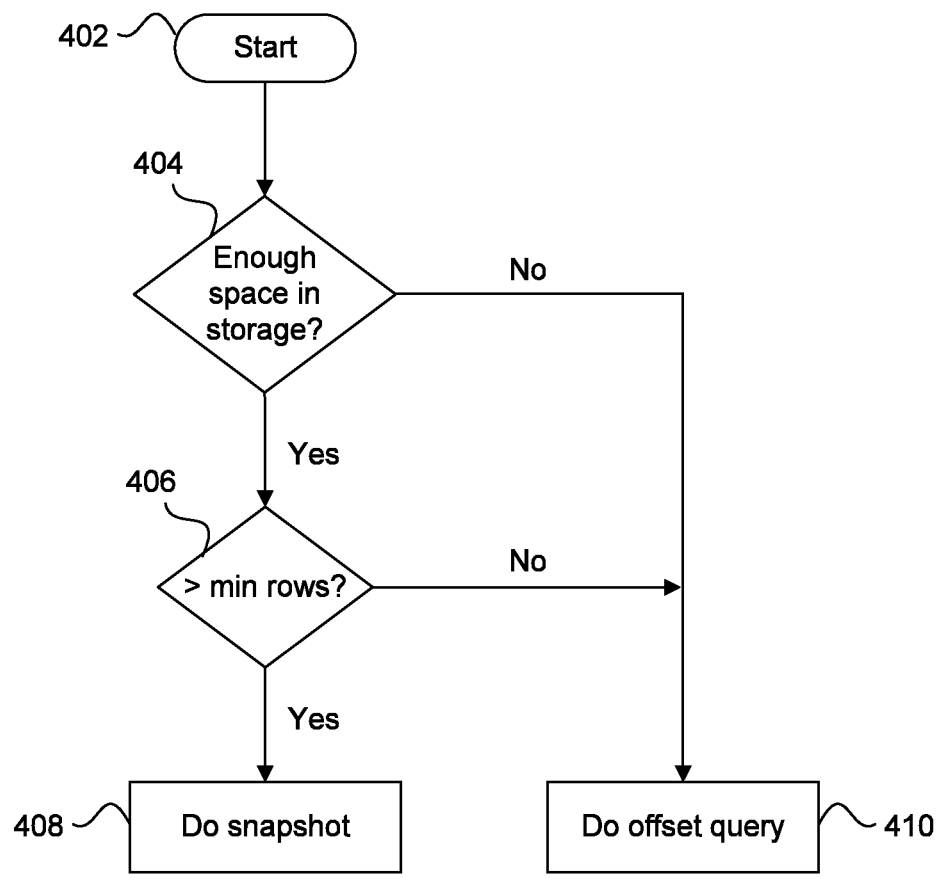
FIG. 4 is a flowchart illustrating a process for determining possibility of snapshot pagination.

FIG. 4 describe the details of 318 in FIG. 3 which determines the possibility of a snapshot query, in other words, if the snapshot query satisfies the snapshot conditions. In 402, the data provider 110 has determined that the query received is a snapshot query with no skiptoken.

In 404, the data provider 110 determines if there is enough space in the snapshot storage 124. In an embodiment, the data provider 110 checks the available space in the memory snapshot storage 202, the disk snapshot storage 206 and any other storage used to stored snapshot. If any of the storage has enough space for the snapshot corresponding to the snapshot query, the data provider 110 determines that there is enough space. The data provider 110 may estimate the space needed for the snapshot corresponding to the snapshot query by checking the content of snapshot query. In some embodiment, the data provider 110 may conduct test by taking a portion or all of the snapshot corresponding to the snapshot query to estimate the space needed for the snapshot. In an embodiment, the data provider 110 may also determines that the snapshot to be stored in a particular storage, for example, the memory snapshot storage 202 for the benefit of fast reading and writing speed. And if the memory snapshot storage 202 does not have enough space, the data provider 110 does not consider other storages and determines there is not enough space for the snapshot. If the data provider 110 determines that there is enough space in the storage, the control moves to 406.

In 406, the data provider 110 determines if the query requests the data with number of rows larger than a minimum number of rows. The minimum number of rows may be predefined as system configuration or dynamically configured based on system status and user preference. This is because snapshot query used by snapshot pagination technique is more efficient when the query requests for large amount of data. If the data provider 110 determines the number of rows of the data request is larger than the minimum number of rows, the control moves to 408 and continuous on rest procedures of the snapshot pagination. In an embodiment, 408 proceeds to 320 in FIG. 3.

Referring back to 404, if the data provider 110 determines that there is not enough space in storage for the snapshot, the control moves to 410. In an embodiment, 410 is equivalent to 316 in FIG. 3.

Referring back to 406, if the data provider 110 determines the number of rows of the request data is less than the minimum number of rows, the control moves to 410.

Figure 5:
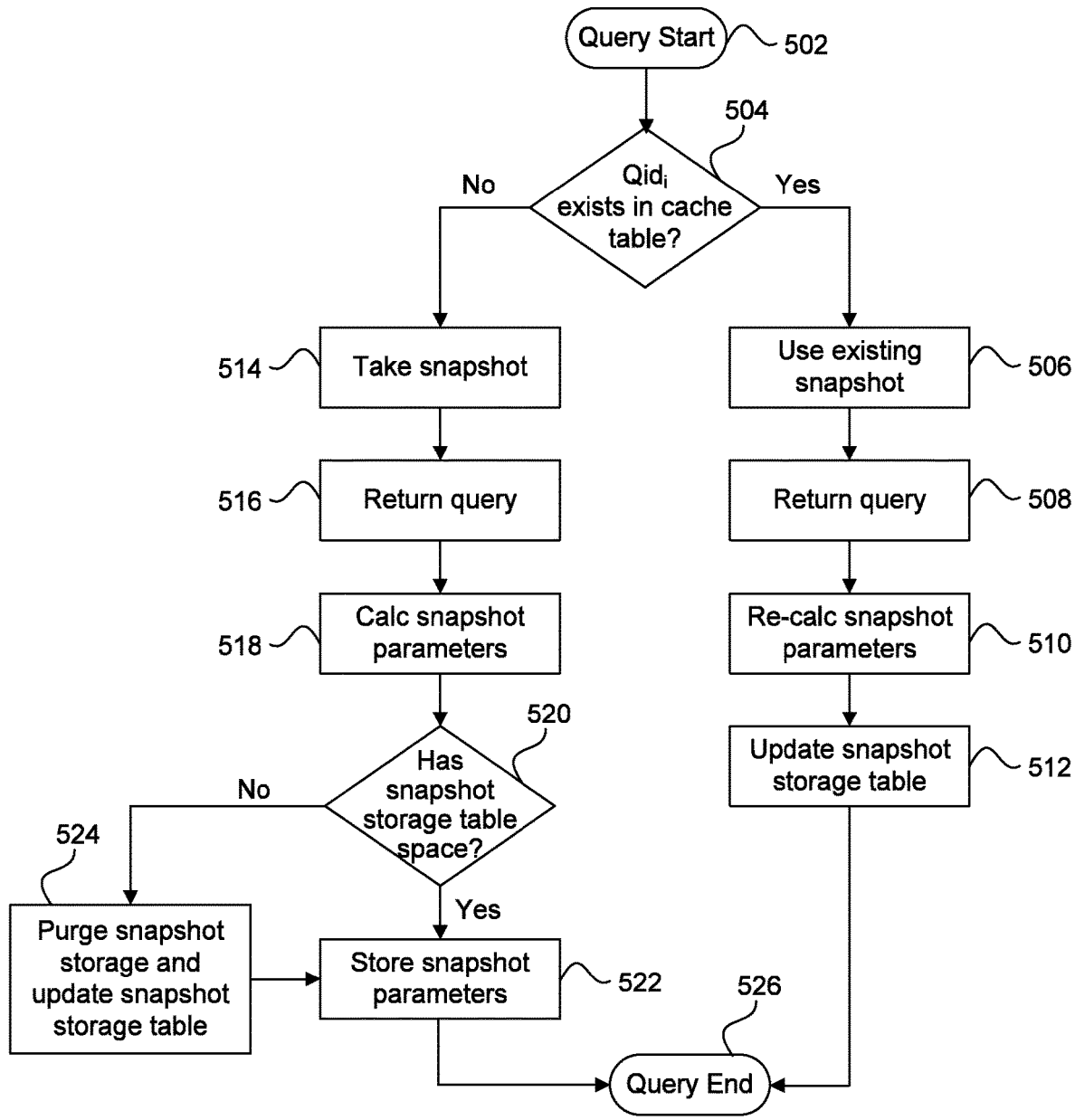
FIG. 5 is a flowchart illustrating a process for maintaining the snapshot storage and snapshot storage table.

FIG. 5 is a flowchart illustrating a process for maintaining the snapshot storage table. The data provider 110 maintains the snapshot storage table in order to record and manage the stored snapshot. Table 1 demonstrates an example of the snapshot storage table. Each column of the Table 1 represent one parameter of the snapshot and the parameters of one snapshot are stored in one row in the Table 1.

TABLE 1

| Query Id | Record Number | Pages Queried | Business Key Size | Last Query Time | Index |
|---|---|---|---|---|---|
| $Qid_1$ | $RN_1$ | $PQ_1$ | $BKS_1$ | $LQT_1$ | $Ind_1$ |
| $Qid_2$ | $RN_2$ | $PQ_2$ | $BKS_2$ | $LQT_2$ | $Ind_2$ |
| ... | ... | ... | ... | ... | ... |
| $Qid_m$ | $RN_m$ | $PQ_m$ | $BKS_m$ | $LQT_m$ | $Ind_m$ |

The data provider 110 generates Query Id based on the snapshot query. In an embodiment, the data provider 110 uses the information of the snapshot query to generate Query Id, for example, the type of the requested data and characteristic of the requested data. In an embodiment, the data provider 110 generates Query Id using the snapshot query text. The data provider110 may generate the Query Id using message-digest algorithm MD5 or other hash functions.

The data provider 110 calculates Record Number based on the amount of data request in terms of number of records. In an embodiment, each record is corresponding to a business key. The snapshot contains the business keys of the requested record, but not the records themselves.

The data provider 110 calculates Pages Queried based on the number of pages needed to present the request data. In an embodiment, the size of a page depends on the user device 102 and the application 104.

The data provider 110 determines the Business Key Size by checking the size of business key. In an embodiment, the business keys may have the same size or different sizes. The data provider 110 may determine the Business Key Size by take an average size of the business keys if business keys have different sizes. In an embodiment, the data provider 110 calculates the Business Key Size based on the total size of the business keys in the snapshot.

The data provider 110 records the Last Query Time when the query is executed or used to generate executable query. In some embodiment, the data provider 110 update the Last Query Time when the query is received by the data provider 110.

The data provider 110 calculates the Index based on values of other columns in the same row. For example, the data provider 110 may calculate the Index as below:

$$Ind_1 = w_1 \times Qid_1 + w_2 \times RN_1 + w_3 \times PQ_1 + w_4 \times BKS_1 + w_5 \times LQT_1.$$

The coefficients $w_1$, $w_2$, $w_3$, $w_4$, and $w_5$ are weight factors for each column. The column with larger weight factor has bigger impact on the Index value. In an embodiment, the weight factors may be predetermined based on system design or the data provider 110 may configure the weight factors dynamically. In some embodiment, the data provider 110 sorts the rows of Table 1 in order so that $Ind_1 < Ind_2 < \ldots < Ind_m$.

In 502, the data provider 110 receives a query, determines the query is a snapshot query, and determines that the snapshot query is possible.

In 504, the data provider 110 calculates the Query Id of the snapshot query as $Qid_i$ as described above, then compares $Qid_i$ with the Query Id stored in the snapshot storage table. If the data provider 110 determines that no Query Id in the snapshot storage table matches $Qid_i$, the control moves to 514.

In 514, the data provider 110 obtains the business keys of the data requested by the snapshot query. The business keys form the snapshot of the snapshot query.

In 516, the data provider 110 sends the snapshot with the business keys to the query generator 112 to generate an executable query to be executed by the query executor 114 as described above. In an embodiment, the data provider 110 sends the business keys corresponding to the data that can be presented in one page of the application 104.

In 518, the data provider 110 calculates the parameters of the snapshot including Query Id, Record Number, Pages Queried, Business Key Size, Last Query Time and Index. In an embodiment, the data provider 110 uses the Query Id calculated in 504 instead of calculating the Query Id again.

In 520, the data provider 110 determines if the snapshot storage table has space to store the parameters of the snapshot. The snapshot storage table has limited space as described above. If the data provider 110 determines that the snapshot storage table has space, the control moves to 522.

In 522, the data provider 110 stores the snapshot parameters in the snapshot storage table, sort the snapshot storage table in the order of the Index parameter as described above, store the snapshot in the snapshot storage 124, and the query ends in 526.

Referring back to 520, if the data provider 110 determines that the snapshot storage table is full, the control moves to 524.

In 524, the data provider 110 compares the Index parameter of the snapshot with the Index parameters in the snapshot storage table. If there is at least one Index parameter in the snapshot storage table larger than the Index parameter of the snapshot, the data provider 110 removes parameters in a row of the snapshot storage table containing the largest Index parameter, and purges the corresponding snapshot stored in the snapshot storage. In an embodiment, if the Index parameter of the snapshot is larger than any of the Index parameter in the snapshot storage table, the data provider 110 still removes the parameters in the row of the snapshot storage table with the largest Index parameter. In an embodiment, the data provider 110 may not store the snapshot parameters in the snapshot storage table if the snapshot has the largest Index parameter compares to the Index parameter in the snapshot storage table and the control moves to 526 without going through 522.

Referring back to 504, if the data provider 110 determines that the Query Id of the snapshot query matches one of the Query Id in the snapshot storage table, the control moves to 506.

In 506, the data provider 110 extracts the stored snapshot corresponding to the Query Id from the snapshot storage 124 as described above in FIG. 2.

In 508, the data provider 110 sends the extracted snapshot to the query generator 112 to generate the executable query to be executed by the query executor 114 as described above.

In 510, the data provider 110 recalculates the parameters of the snapshot such as Last Query Time and Index.

In 512, the data provider 110 updates the parameter of the snapshot in the snapshot storage table with the parameters recalculated in 510.

Figure 6:
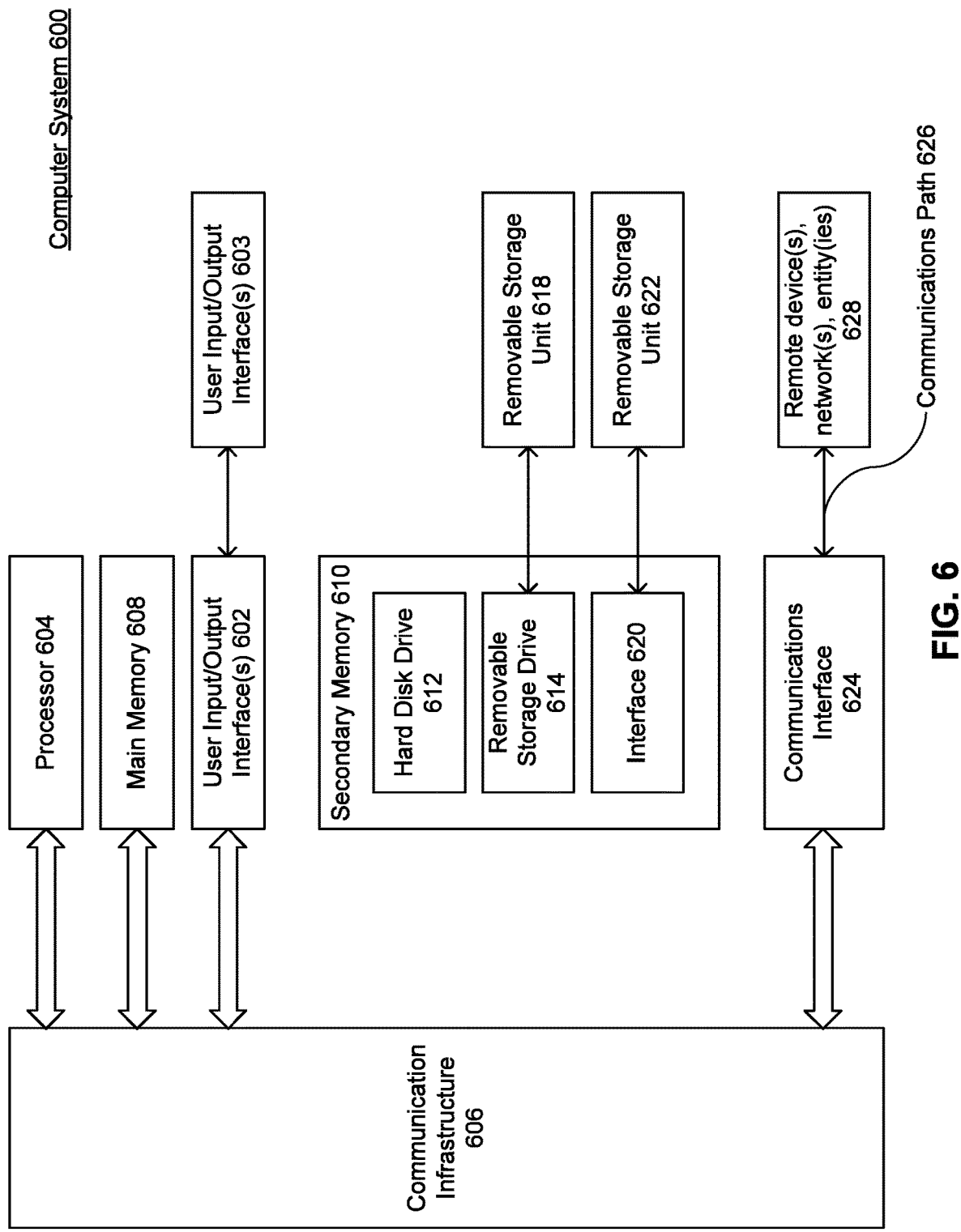
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for processing a data query, comprising:
   receiving, by one or more computing devices, the data query;
   determining that the data query includes a snapshot query;
   in responsive to determining that the data query includes the snapshot query, identifying physical locations of at least some of data requested by the data query;
   taking, by the one or more computing devices, a snapshot, wherein the snapshot includes the physical locations of the at least some of data;
   storing, by the one or more computing devices, the snapshot into a snapshot storage; and
   extracting, by the one or more computing devices, the at least some of data from a data storage based on the physical locations included in the snapshot.

2. The computer-implemented method of claim 1, wherein the snapshot comprises business keys that contain physical locations of the at least some of data.

3. The computer-implemented method of claim 1, further comprising:
   calculating, by the one or more computing devices, an index of the snapshot;
   determining, by the one or more computing devices, that the index is smaller than a stored index in a snapshot storage table; and
   updating, by the one or more computing devices, the snapshot storage table by removing entries in a row containing the stored index and storing the snapshot information in the row of the snapshot storage table.

4. The computer-implemented method of claim 1, wherein the snapshot contains more than a predetermined number of rows; and wherein the predetermined number of rows is a number of rows contained in one display page of a user device.

5. The computer-implemented method of claim 1, wherein the taking the snapshot further comprises determining that the snapshot query is received for a first time and that the snapshot query satisfies snapshot conditions.

6. The computer-implemented method of claim 5, wherein the snapshot conditions include a snapshot query indicator in the data query or an amount of data requested by the data query.

7. The computer-implemented method of claim 5, wherein the snapshot conditions are based on an availability of the snapshot storage or a minimal number of rows of the data requested by the snapshot query.

8. A system, comprising:
   a memory; and
   at least one processor coupled to the memory and configured to:
   receive a data query;
   determine that the data query includes a snapshot query;

in responsive to determining that the data query includes the snapshot query, identify physical locations of at least some of data requested by the data query;

take a snapshot, wherein the snapshot includes the physical locations of the at least some of data;

store the snapshot into a snapshot storage; and extract the at least some of data from a data storage based on the physical locations included in the snapshot.

9. The system of claim 8, wherein the snapshot comprises business keys that contain physical locations of the at least some of data.

10. The system of claim 8, wherein the at least one processor is further configured to:

calculate an index of the snapshot;

determine that the index is smaller than a stored index in a snapshot storage table; and update the snapshot storage table by removing entries in a row containing the stored index and storing the snapshot information in the row of the snapshot storage table.

11. The system of claim 8, wherein the snapshot contains more than a predetermined number of rows; and wherein the predetermined number of rows is a number of rows contained in one display page of a user device.

12. The system of claim 8, wherein to take the snapshot, the at least one processor is configured to determine that the snapshot query is received for a first time and that the snapshot query satisfies snapshot conditions.

13. The system of claim 12, wherein the snapshot conditions include a snapshot query indicator in the data query or an amount of data requested by the data query.

14. The system of claim 12, wherein the snapshot conditions are based on an availability of the snapshot storage or a minimal number of rows of the data requested by the snapshot query.

15. A non-transitory computer-readable device having instructions stored thereon that, when executed by at least one computing device, causes the at least one computing device to perform operations to process a data query, the operations comprising:

receiving the data query;

determining that the data query includes a snapshot query;

in responsive to determining that the data query includes the snapshot query, identifying physical locations of at least some of data requested by the data query;

taking a snapshot, wherein the snapshot includes the physical locations of the at least some of data;

storing the snapshot into a snapshot storage; and extracting the at least some of data from a data storage based on the physical locations included in the snapshot.

16. The device of claim 15, wherein the snapshot comprises business keys that contain physical locations of the at least some of data.

17. The device of claim 15, the operations further comprising:

calculating an index of the snapshot;

determining that the index is smaller than a stored index in a snapshot storage table; and updating the snapshot storage table by removing entries in a row containing the stored index and storing the snapshot information in the row of the snapshot storage table.

18. The device of claim 15, wherein the taking the snapshot further comprises determining that the snapshot query is received for a first time and that the snapshot query satisfies snapshot conditions.

19. The device of claim 18, wherein the snapshot conditions include a snapshot query indicator in the data query or an amount of data requested by the data query.

20. The device of claim 18, wherein the snapshot conditions are based on an availability of the snapshot storage or a minimal number of rows of the data requested by the snapshot query.

* * * * *